April 9, 1963  D. C. MORTON ETAL  3,084,783
HANDLING OF FLAT ARTICLES
Filed Oct. 4, 1960  4 Sheets-Sheet 1
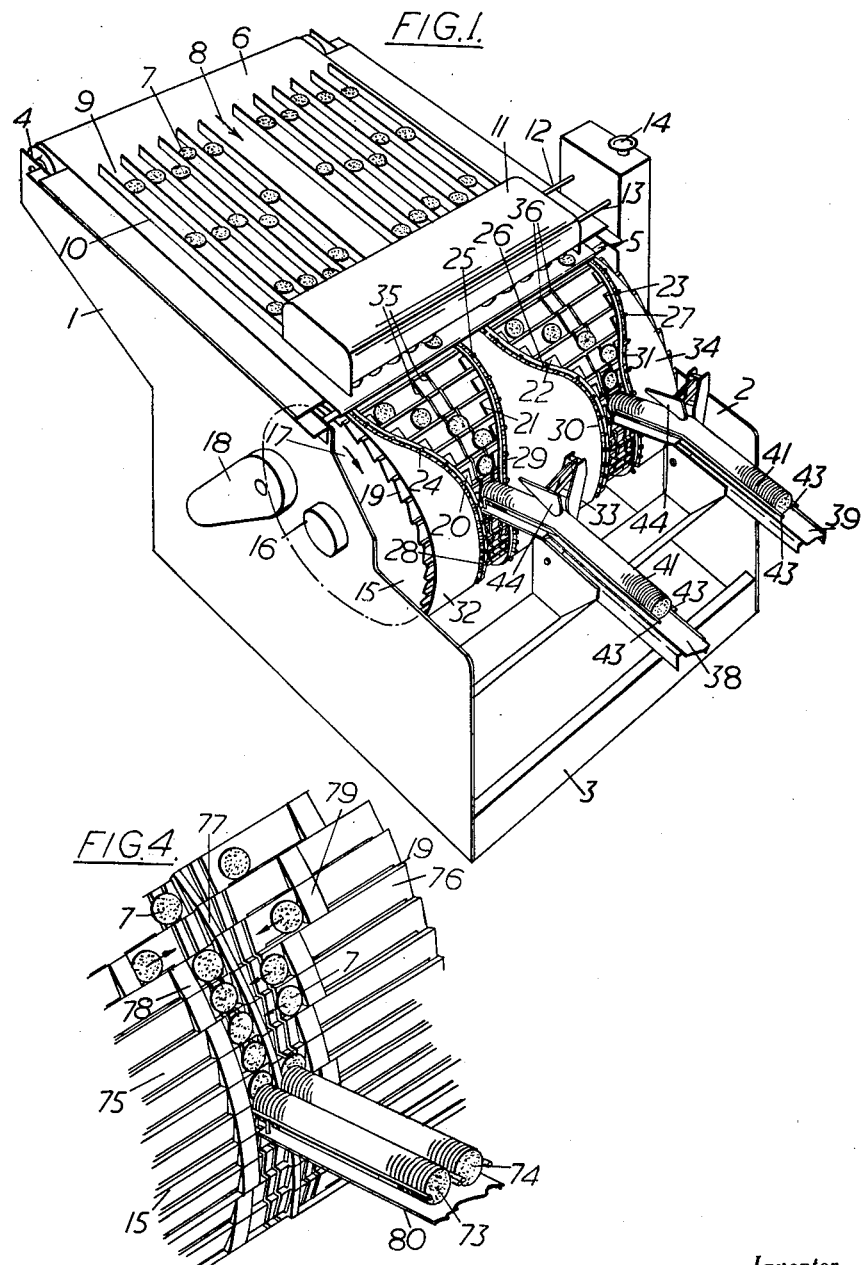
Inventor
PERCIVAL JAMES PACKMAN
DAVID CHARLES MORTON
By
Attorneys

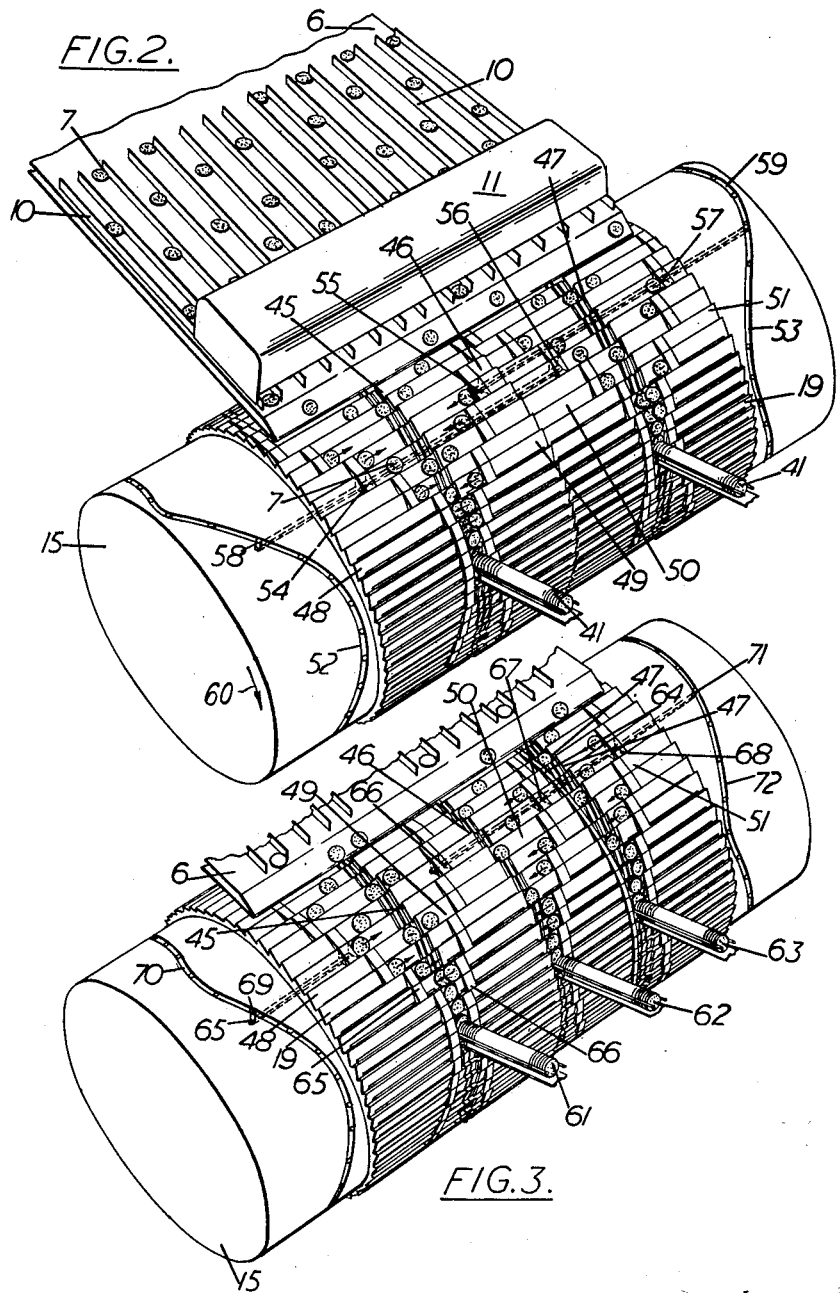

April 9, 1963   D. C. MORTON ETAL   3,084,783
HANDLING OF FLAT ARTICLES
Filed Oct. 4, 1960   4 Sheets-Sheet 3
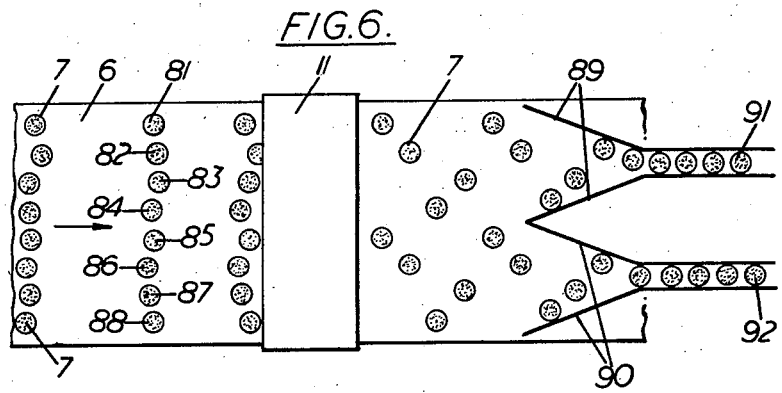
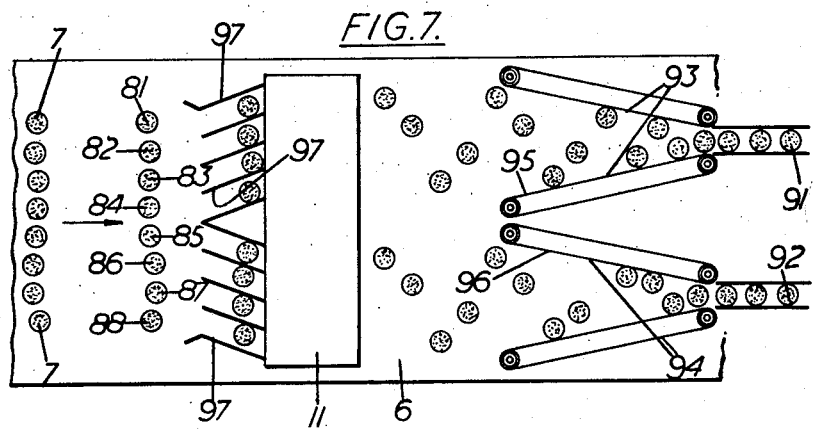
Inventor
PERCIVAL JAMES PACKMAN
DAVID CHARLES MORTON
By
Attorneys April 9, 1963 D. C. MORTON ETAL 3,084,783
HANDLING OF FLAT ARTICLES
Filed Oct. 4, 1960 4 Sheets-Sheet 4

Inventor
PERCIVAL JAMES PACKMAN
DAVID CHARLES MORTON
By
Attorneys

3,084,783
HANDLING OF FLAT ARTICLES
David Charles Morton and Percival James Packman, Twyford, England, assignors to Baker Perkins Limited, Peterborough, England, a British company
Filed Oct. 4, 1960, Ser. No. 60,480
Claims priority, application Great Britain Oct. 7, 1959
14 Claims. (Cl. 198—35)

This invention relates to machines for handling numbers of substantially identical flat articles; in particular cookies.

After baking, cookies normally emerge from the oven on a conveyor in a number of rows or lanes arranged side by side and spaced apart from each other across the width of the conveyor. The cookies are also spaced apart from each other in the various rows or lanes in a direction along the conveyor, but the intervals between the cookies in this direction are variable and to enable certain further operations to be carried out on the cookies it is necessary first to reduce the number of lanes in which they are travelling and to assemble them into a more ordered sequence.

According to the present invention, a machine for handling a series of substantially identical flat articles such as cookies comprises a moving conveyor for receiving the articles in a number of rows or lanes spaced apart across its width, a device above each lane which temporarily stops or reduces the speed of each article and then releases it so that the spacing of the articles in the direction of travel of the conveyor is adjusted and means for moving the articles in a number of adjacent lanes laterally so that they are aligned with each other in one lane, the spacing of the articles in the direction of travel of the conveyor being, after adjustment, such that the articles avoid contact with each other as they are moved laterally.

Preferably the devices which temporarily stop or reduce the speed of the articles and then release them are so co-ordinated that successively released articles are spaced apart at substantially equal intervals along the conveyor. For some purposes it is necessary that the articles should be accurately spaced at equal intervals and for this purpose a curved moving conveying surface may be provided on to which the articles are transferred by the conveyor. This surface extends, at the transfer point, substantially in line with the conveyor and thereafter turns downwards. The surface is formed with steps at equal intervals along its direction of movement and moves at a speed such that one article is deposited on each step. The articles are then removed from the steps by a device which engages with them as the articles move past the device and assembles the articles in an orderly arrangement.

This machine may be used to assemble the cookies or other flat articles in a single lane at accurately spaced intervals, as already mentioned, and then to feed them on to a further conveyor on which they are transferred for further operations to take place on them, but most frequently it is desirable to assemble the cookies or other articles into a stack ready for wrapping. By a "stack" is meant an aligned column in which the articles lie face to face, but the axis of the colum may be horizontal or at some angle to the horizontal.

For this purpose, in accordance with the present invention, a machine for stacking a series of substantially identical flat articles initially lying at random intervals in a number of rows or lanes arranged side by side comprises a moving conveyor for receiving the articles in their lanes spaced apart across the conveyor, a device above each lane which temporarily stops or reduces the speed of each article and then releases it, the devices being so co-ordinated that successively released articles are spaced apart at substantially equal intervals along the conveyor, a curved moving conveying surface on to which the articles are transferred by the conveyor, the surface extending, at the transfer point, substantially in line with the conveyor and thereafter turning downwards until it is nearly vertical and the surface being formed with steps at equal intervals along its direction of movement and moving at a speed such that one article is deposited on each step, means for moving the articles in a number of lanes laterally so that the articles on successive steps are aligned in the direction of movement of the surface and stationary members between which the steps pass in succession on which each article is deposited in an upright position, the face of each step moving the previously deposited article forwards to leave a space for the next article so that the articles are assembled on the members in a stack.

Machines for stacking articles in this way have been previously known, but they are all slow in operation. The machine in accordance with the further feature of the present invention operates far more quickly and efficiently.

The devices above the lanes for temporarily stopping or reducing the speed of each of the articles preferably takes the form of a metering arrangement and escapement mechanism described in British specification No. 823,744. These devices not only ensure the accurate spacing of the articles along the moving conveyor, but since the devices may be mounted on a common shaft, the relative phasing between adjacent devices may very easily be adjusted. This enables the machine to handle articles of different sizes.

The means for moving the articles in a number of lanes laterally may act on the articles immediately after they have passed the device which temporarily stops them or reduces their speed, but whilst the articles are still on the moving conveyor. In this case, the device may consist of a pair of guide surfaces converging into a single lane and against either one of which the articles engage as they are moved forwards. Preferably, however, the means acts on the articles after they have been deposited on the steps of the curved conveying surface. The means generally comprises a pusher mounted on each step and a cam which causes the pushers to move along the steps to move the articles into alignment with each other whilst they are actually on the steps.

The curved conveying surface can most easily be made in the form of a circular drum which rotates about its axis. The steps extend axially along the periphery of the drum at equal angular intervals around its surface. The face of each step on the curved conveying surface may be stepped radially along its length, the parts of the face on each side of the step being displaced radially from each other. When this is done, the relative speeds of the conveyor and the curved conveying surface may be made such that two articles are deposited on each step, one on each side of the radial step. With this modified construction, the devices for releasing cookies may be so adjusted that instead of releasing single cookies at substantially equal intervals along the direction of movement of the conveyor, two articles are released more or less simultaneously. One of these articles moves on to one step on one side of the radial step and the other on the other side of the radial step. The effect of the operation of the pushers is then to move one article into engagement with the radial step and to move the other article over the step so that it lies on top of the first article. Consequently, when the two articles move between the stationary members the two articles are added at the same time to the stack formed on the stationary members. If two articles are fed by the conveyor on to every step of the curved conveying surface the rate of formation of the stack for a given speed of the curved surface is doubled. In practice, however, the rate of feed of the articles is usually controlled by the conveyor by which they are moved on to the curved conveying surface and accordingly for a given speed of the curved conveying, the speed of the curved conveying surface may be halved and this is found greatly to facilitate the operation of the machine.

The machine may be arranged to form a single lane or stack of articles by moving all the articles in the whole original number of lanes so they are laterally aligned with each other, but alternatively, the articles in the initial number of lanes, if this is large, may be moved into two or even three separate lanes from which two or three separate stacks may be formed.

Some examples of machines constructed in accordance with the invention are illustrated in the accompanying drawings, in which:

FIGURE 1 is a diagrammatic perspective view of one example;

FIGURE 2 is a similar diagrammatic perspective view of part of another example;

FIGURE 3 is a similar view of part of a third example;

FIGURE 4 is a perspective detail to a larger scale of a modification of the machine shown in FIGURE 2;

FIGURE 6 is a plan view of a modified arrangement for moving the articles laterally into two lanes which may be used with the other parts of the machine shown in FIGURE 2;

FIGURE 7 is a view similar to FIGURE 6 showing a further modification of the device for moving the articles laterally.

Figure 5:
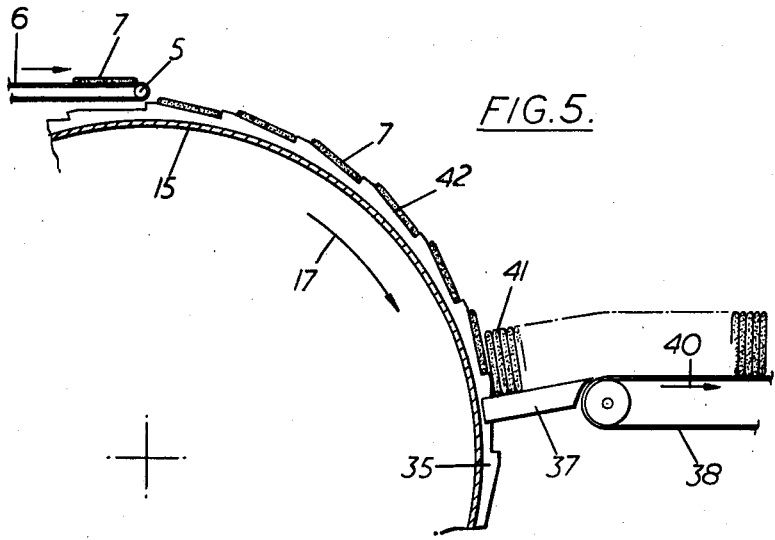
FIGURE 5 is a diagrammatic section to a larger scale through a part of a drum in the machine shown in FIGURE 1.

The example of the machine shown in FIGURE 1 has side plates 1 and 2 which are fixed together by a cross member 3 and together form a housing containing the driving mechanism of the machine which is electrically operated and, being quite conventional in construction, is not illustrated in detail.

Mounted on rollers 4 and 5, which extend between the top edges of the plates 1 and 2, is an endless conveyor belt 6. The upper flight of the conveyor belt 6, on which cookies 7 are conveyed, is moved in the direction of the arrow 8 by the driving mechanism which rotates the roller 4. Ten separate lanes 9 are defined on the top surface of the conveyor belt 6 by fixed partitions 10 which are just clear of the surface of the conveyor belt 6. The cookies 7 are removed from an oven in which they are baked by the conveyor belt 6 and moved at random intervals down the various lanes 9 towards a number of metering arrangements and escapement mechanisms contained within a housing 11 arranged immediately above the surface of the conveyor belt 6. The metering arrangements and escapement mechanisms are driven through shafts 12 and 13. The metering arrangements and escapement mechanisms are described in detail in British specification No. 823,744 and therefore no details of them are described in this specification. The shafts 12 and 13 by which they are driven are, however, rotated through an infinitely variable control gear which is actuated by a handle 14. Adjustment of the handle 14 enables the metering arrangements and escapement mechanisms to be adjusted to vary the linear spacing at which the cookies 7 are discharged from the mechanisms and also to enable the metering arrangements and escapement mechanisms to accommodate cookies of different sizes.

A circular drum 15 is rotatably mounted on a shaft 16 which extends between the side plates 1 and 2. The drum 15 is rotated in the direction of the arrow 17 at an adjustable, but otherwise constant, speed by a rim drive contained within a cover 18. The periphery of the drum 15 is formed with a series of equally spaced steps 19. Slidably mounted on each of the steps 19 are four sets of pushers 20, 21, 22 and 23. The sets of pushers 20 to 23 have respectively cam follower pins 24 to 27. These pins engage in cam tracks or guides 28, 29, 30 and 31 formed in plates 32, 33 and 34 which extend over parts of the surface of the drum 15. The drum 15 is provided with two pairs of peripheral grooves 35 and 36 spaced midway between the symmetrical cam tracks 28 and 29 and 30 and 31 respectively. In each of these grooves a stripper bar 37 engages. One of the grooves 35 and one of the stripper bars 37 is shown most clearly in FIG. 5 of the drawings. The stripper bars 37 are slightly upwardly inclined in a direction away from the surface of the drum 15 and end adjacent two further conveyor belts 38 and 39. These belts are driven in the direction of the arrow 40 in FIGURE 5.

In operation the cookies are moved between the partitions 10 by the conveyor belt 6 beneath the metering arrangements and escapement mechanisms in the housing 11. From the metering arrangements and escapement mechanisms the cookies emerge at substantially equal intervals in the direction of movement of the conveyor belt 6. As the cookies 7 emerge, one cookie is deposited on each of the steps 19 on the drum 15. The cookies emerging from the five left-hand lanes on the conveyor belt 6 shown in FIGURE 1 pass on to the steps 19 between the pushers 20 and 21. The cookies from the other five lanes pass on to the steps 19 between the pushers 22 and 23. As the drum 15 rotates the pins 24 to 27 travel along their respective cam tracks 28 to 31 and, in so doing, move the corresponding pushers inwards towards the grooves 35 and 36. The cookies 7 are in consequence also moved into a position in between these two grooves so that they are all circumferentially aligned with each other on the drum 15.

As the parts of the steps on which the cookies are retained pass between the stripper bars 37 the cookies are deposited in a stack 41 on the stripper bars as shown in FIGURE 5 of the drawings. The faces 42 of the steps 19 are inclined so that the whole stack 41 is moved to the right and a space is formed for each successive cookie 7 to be deposited on the stripper bars 37. As the size of the stack 41 increases, the right-hand end cookies in the stack are pushed off the stripper bars 37 on to their respective conveyor belts 38 or 39 by which they are conveyed to a wrapping machine. The cookies are supported on the conveyor belts 38 and 39 by rails 43 arranged on each side of the two stacks. Detectors 44 are arranged above each of the stacks 41 and these bear lightly against the top edges of the cookies in the stack. The detectors 44 are operatively connected to electric motors driving the conveyor belts 38 and 39 and control the speed of these motors to ensure that the speed of these belts is matched to the speed at which the cookies are stacked on the belts 38 and 39 from the drum 15.

In the example shown in FIGURE 2, the general construction of the machine is similar to that shown in FIGURE 1 and the conveyor belt 6, the metering arrangements and escapement mechanisms in the housing 11 and their driving mechanisms are exactly the same. The conveyor belts 38 and 39 by which the stacks of cookies 41 are removed from the drum 15 are also the same. In this example, however, the steps 19 are each formed with three radial steps 45, 46 and 47. The steps 45 to 47 are arranged so that the left-hand end portion 48 of each step is recessed radially further inwards than the left centre portion 49 and the right centre portion 50 is recessed radially inwards of the right upper portion 51. Also, instead of the four cam tracks 28 to 31 only two cam tracks 52 and 53 are provided, one at each end of the drum.

Each of the step portions 48 to 51 has slidably mounted on it a pusher 54 to 57 respectively. The pushers 54 and 56 are both connected by rods within the drum 15 to a cam follower pin 58 in the cam track 52 and the other two pushers 55 and 57 are connected by another rod within the drum 15 to a further cam follower pin 59 in the cam track 53. As the drum 15 rotates in the direction of the arrow 60, the pusher 54 pushes a cookie 7 up against the shoulder formed by the step 45. At the same time the corresponding pusher 55 pushes another cookie over the step 45 so that it lies directly on top of the first cookie which is lying against the step. At the same time as this is happening, the pusher 56 pushes a cookie against the step 47 and the pusher 57 pushes another cookie over the step 47 on top of this cookie. The cookies reach these positions just before the step on which they are lying reaches the conveyor belt 38. When this happens, all four cookies are removed simultaneously from the step by the two pairs of stripper bars 37.

The example shown in FIGURE 3 is again generally similar to that shown in FIGURE 1, but in this case, the drum 15 is arranged to form three separate stacks of cookies 61, 62 and 63. For this purpose each step 19 is again divided into four sections similar to the portions 48 to 51 but, as well as this division, each step is provided with a stop 64 just to the left of the step 47. Each section of each step is again provided with a pusher 65 to 68 respectively. The pusher 65 is connected to a cam follower pin 69 in a cam track 70 at the left-hand end of the drum 15 and the pushers 65 to 68 are all connected to a cam follower pin 71 in a cam track 72 at the right-hand end of the drum. Cookies deposited by the conveyor belt 6 on to the left-hand portion 48 of the steps 19 are moved by the pusher 65 into a position against the radial step 45. Cookies on the portion 49 are moved by the pusher 66 over the radial step 45 so that they lie on top of the cookies already moved against this step by the pusher 65. Both these cookies are then deposited in the stack 61. Cookies deposited on the portion 50 are moved by the pusher 67 against the step 46 and are eventually deposited in the stack 62. Cookies deposited on the portion 51 are moved by the pusher 68 over the step 47 into contact with the stop 64. These cookies are then deposited in the stack 63.

By means of the modification shown in FIGURE 4, the machine is arranged to form four separate stacks. Two of these stacks are shown at 73 and 74. In this case, the drum 15 is again divided into four separate sections, but there are no radial steps between the sections. Between the two right-hand sections 75 and 76 there is a stop 77. The left-hand end of the drum 15 is formed in a similar manner and there is another stop, not shown, between the two left-hand sections. Once again, each of the four sections of each step is provided with a slidable pusher and, as shown in FIGURE 4, a cookie deposited on each section of each step is moved by its corresponding pusher 78 or 79 against the stop 77 or the corresponding stop towards the other end of the drum. The cookies are then stripped from the steps into either of the stacks 73 or 74 or the two corresponding stacks near the other end of the drum. The stacks 73 and 74 are removed by a common conveyor 80 and the other two stacks are removed by a similar conveyor.

In all the examples so far illustrated the cookies lie on the conveyor belt 6 in a large number of lanes and they are deposited on the steps 19 of the drum 15 in a similar number of lanes, although the spacing of the cookies along the conveyor 6 has been adjusted by the metering arrangements and escapement mechanisms within the housing 11. As an alternative, however, the number of lanes in which the cookies lie on the conveyor 6 may be reduced before the cookies leave the conveyor belt 6 and when this is done, there is no longer any necessity to provide pusher members on the drum 15 to bring the cookies into alignment with each other in their direction of travel. Two arrangements by which this alignment of the cookies may be carried out are shown in FIGURES 6 and 7 of the drawings.

In FIGURE 6, eight rows of cookies 81 to 88 pass into the metering arrangements and escapement mechanisms in the housing 11 and move away from this housing spaced apart from each other longitudinally at equal intervals. The cookies then come into contact with either one of two pairs of converging guide plates 89 or 90. The guide plates 89 move the cookies in the lanes 81 to 84 into alignment with each other in a single lane 91 and the pair of guide plates 90 similarly move cookies in the lanes 85 to 88 into another lane 82. These two lanes of cookies are deposited in their aligned state on a drum 15 similar to that shown in FIGURE 1 and without being moved transversely along these steps are then formed into the stacks 41.

The arrangement shown in FIGURE 7 is similar to that shown in FIGURE 6 but instead of the pairs of converging guide plates 89 and 90 there are pairs of converging conveyor belts 93 and 94. These converging belts perform the same function as the pairs of guide plates 89 and 90, but because they move at the same forward speed as the belt 6, they do not exert any drag on the cookies and so the possibility of moving the cookies out of their even linear spacing is reduced. Because, however, there is a considerable lateral distance between the inner end 95 of the inner of the pair of conveyor belts 93 and the inner end 96 of one of the belts 94, the lanes 81 to 84 must be separated from the lanes 85 to 88 before they enter the metering arrangements and escapement mechanisms within the housing 11. For this purpose, inclined guide plates 97 are provided. These guide plates may exert a drag on the cookies, but before they pass under the housing 11, the spacing of the cookies is not important. The cookies in the lanes 91 and 92 in FIGURE 7 of the drawings are then deposited on a drum 15 similar to that shown in FIGURE 1 as has been described with reference to FIGURE 6.

Figure 8:
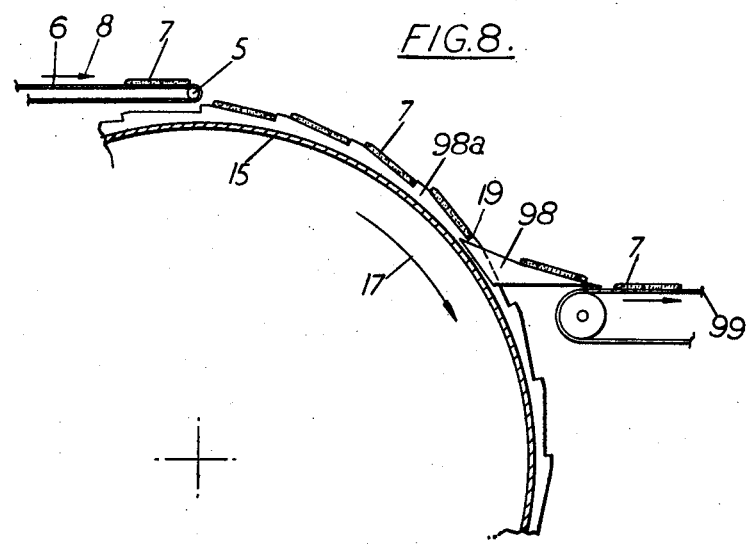
FIGURE 8 is a section similar to FIGURE 5, but showing a further modification of the machine in FIGURE 2.

FIGURE 8 shows a further modification of the machine shown in FIGURE 2 in which, instead of providing stripper bars 37 on which a stack of cookies 41 is formed, a pair of inclined stripper plates 98 are provided. These inclined stripper plates engage in grooves 98a in a similar manner to the stripper bars 37 and strip the cookies from the steps 19 before the cookies have reached an upright position and the cookies move down the plate lying in a flat position on to a conveyor 99. The conveyor removes the cookies in a single lane but with a linear spacing of the cookies of considerably greater accuracy than can be obtained when the cookies issue from the metering arrangements and escapement mechanisms. This accuracy is produced by the depositing of the cookies on hte steps 19 which can, of course, be at exactly equal intervals. For some purposes the arrangement of cookies in a very precisely spaced assembly in this way is very useful.

Although the example of the machine in accordance with the invention illustrated in the drawings is particularly intended for handling cookies and only the handling of cookies has been described, similar machines are, of course, equally applicable to the handling of any other flat articles of uniform size which need to be transferred from a number of lanes on a moving conveyor into a stack or into a uniformly spaced single column.

We claim:

1. A machine for stacking a series of substantially identical flat articles initially lying at random intervals in a number of rows or lanes arranged side by side, the machine comprising a moving conveyor for receiving the articles in their lanes spaced apart across the conveyor, a device above each lane which temporarily stops or reduces the speed of each article and then releases it, the devices being so co-ordinated that successively released articles are spaced apart at substantially equal intervals along the conveyor, a curved moving conveying surface on to which the articles are transferred by the conveyor, the surface extending, at the transfer point, substantially in line with the conveyor and thereafter turning downwards until it is nearly vertical and the surface being formed with steps at equal intervals along its direction of movement and moving at a speed such that one article is deposited on each step, means for moving the articles in a number of lanes laterally so that the articles on successive steps are aligned in the direction of movement of the surface and stationary members between which the steps pass in succession on which each article is deposited in an upright position, the face of each step moving the previously deposited articles forwards to leave a space for the next article so that the articles are assembled on the members in a stack.

2. A machine according to claim 1, in which the means for moving the articles in a number of lanes laterally acts on the articles after they have been deposited on the steps of the curved conveying surface.

3. A machine according to claim 2, in which the means for moving the articles laterally comprises a pusher mounted on each step and a cam which causes the pushers to move along the steps into engagement with the articles.

4. A machine according to claim 1 in which the curved conveying surface is on the periphery of a circular drum.

5. A machine according to claim 1 in which the stationary member is in the form of two stripper bars which extend away from the curved conveying surface and each of which engages in a groove extending peripherally around the surface through the steps.

6. A machine according to claim 5, in which a further moving conveyor is provided for removing the stack of articles assembled on the stripper bars, the further conveyor extending from the ends of the bars remote from the curved conveying surface.

7. A machine according to claim 1 in which the face of each step on the curved conveying surface is stepped radially along its length, the parts of the face of the step on each side of the radial step being displaced radially from each other and the conveyor and the curved conveying surface being arranged to be driven at retlative speeds such that two articles are deposited on each step, one on each side of the radial step.

8. In a machine for handling a series of substantially identical flat articles, a moving conveyor for receiving the articles in a plurality of lanes spaced apart across the width of said conveyor, a device above each lane which temporarily stops or reduces the speed of each article and then releases it, the devices being so coordinated that successively released articles are spaced apart at substantially equal intervals along the conveyor and means for engaging with the sides of said longitudinally spaced articles and moving said articles laterally into a single lane, said articles remaining free of contact with each other, said means comprising a rotating drum adjacent said conveyor, a series of axially extending stops formed at equal angular intervals around said drum, rotating at a speed such that one article is deposited on each step by said conveyor, pusher means for engaging with articles deposited on said steps, cam means for moving said pusher means along said steps and aligning said articles into a single lane on said steps, and means for stripping said single lane of articles from said steps.

9. A machine according to claim 8 wherein said engaging means comprises a pair of stationary conveying guides.

10. A machine for handling a series of substantially flat articles, said machine comprising movable conveyor means having a supporting surface adapted to receive said articles in rows spaced laterally of the direction of movement of said conveyor means; article engaging means above said surface of said conveyor means operable to interrupt the movements of said rows of articles; means coordinating said engaging means for operating the latter to release individual articles from successive rows and space said articles longitudinally of the direction of their movement as to permit released articles to be assembled in single file without engaging one another; and means engageable with released articles and operable to shift the latter laterally of their direction of movement into single file said conveyor means including a movable curved conveyor member to which articles are released from said engaging means, said conveyor member having a plurality of steps spaced in the direction of its movement, the speed of movement of said member being timed to the operation of said coordinating means so that an article is deposited on each of said steps of said conveyor member.

11. A machine as set forth in claim 10 including means in the path of movement of articles supported by said conveyor member for receiving said articles from said steps.

12. A machine for handling flat articles comprising a rotatable drum member having a plurality of axially extending, circumferentially spaced steps extending about the periphery of said drum member, each of said steps being adapted to receive and support said articles; pusher means on each of said steps operable to engage articles thereon and push them axially of said drum member; and means connected to said pusher means for operating the latter.

13. The machine as set forth in claim 12 wherein the operating means includes cam means on each of said pusher means.

14. The machine as set forth in claim 13 including fixed guide means engageable with said cam means for guiding the latter.

References Cited in the file of this patent
UNITED STATES PATENTS

| | | |
|---|---|---|
| 1,527,337 | Wilcox | Feb. 24, 1925 |
| 2,555,602 | Nutt | June 5, 1951 |
| 2,860,762 | Alexander | Nov. 18, 1958 |